United States Patent [19]

Kruka et al.

[11] 4,300,218

[45] Nov. 10, 1981

[54] FREE FLOODING HYDROPHONE MOUNTING

[75] Inventors: Vitold R. Kruka; Albert J. Berni; Lawrence D. Park, Jr.; Edward R. Cadena, all of Houston, Tex.

[73] Assignee: Shell Oil Company, Houston, Tex.

[21] Appl. No.: 145,528

[22] Filed: May 1, 1980

[51] Int. Cl.³ .................... G01V 1/38; G01V 1/16
[52] U.S. Cl. .................. 367/165; 367/166; 367/20; 310/339
[58] Field of Search ............. 367/149, 157, 165, 166, 367/171, 173, 20, 180; 310/339

[56] References Cited

U.S. PATENT DOCUMENTS

| | | | |
|---|---|---|---|
| 2,923,915 | 2/1960 | Vogel | 367/171 |
| 3,002,179 | 9/1961 | Kuester | 367/166 |
| 3,249,913 | 5/1966 | Smyth et al. | 367/165 |
| 3,281,769 | 10/1966 | Hueter | 367/162 |
| 3,371,311 | 2/1968 | Cholet et al. | 367/157 |
| 3,659,256 | 4/1972 | Hudson et al. | 367/20 |
| 3,660,809 | 5/1972 | Pearson | 367/165 |
| 3,675,193 | 7/1972 | Davis | 310/337 |
| 3,781,778 | 12/1973 | Sawin et al. | 367/152 |
| 3,833,880 | 9/1974 | Abbott | 367/173 |
| 3,961,304 | 6/1976 | Bakewell | 367/20 |

FOREIGN PATENT DOCUMENTS

833892  5/1960  United Kingdom ............... 367/171

*Primary Examiner*—Nelson Moskowitz

[57] ABSTRACT

A hydrophone mounting in a cavity of the hydrophone cable and a method of mounting the hydrophone. The cavity which is provided in the hydrophone cable may be constructed so that it is free-flooding, that is, the construction allows the liquid in which the hydrophone cable is submerged to completely surround the hydrophone. The cavity serves to insulate the hydrophone from movements and perturbations to the cable so that the hydrophone response is not distorted by these sources of noise.

19 Claims, 4 Drawing Figures

U.S. Patent  Nov. 10, 1981  Sheet 1 of 2  4,300,218
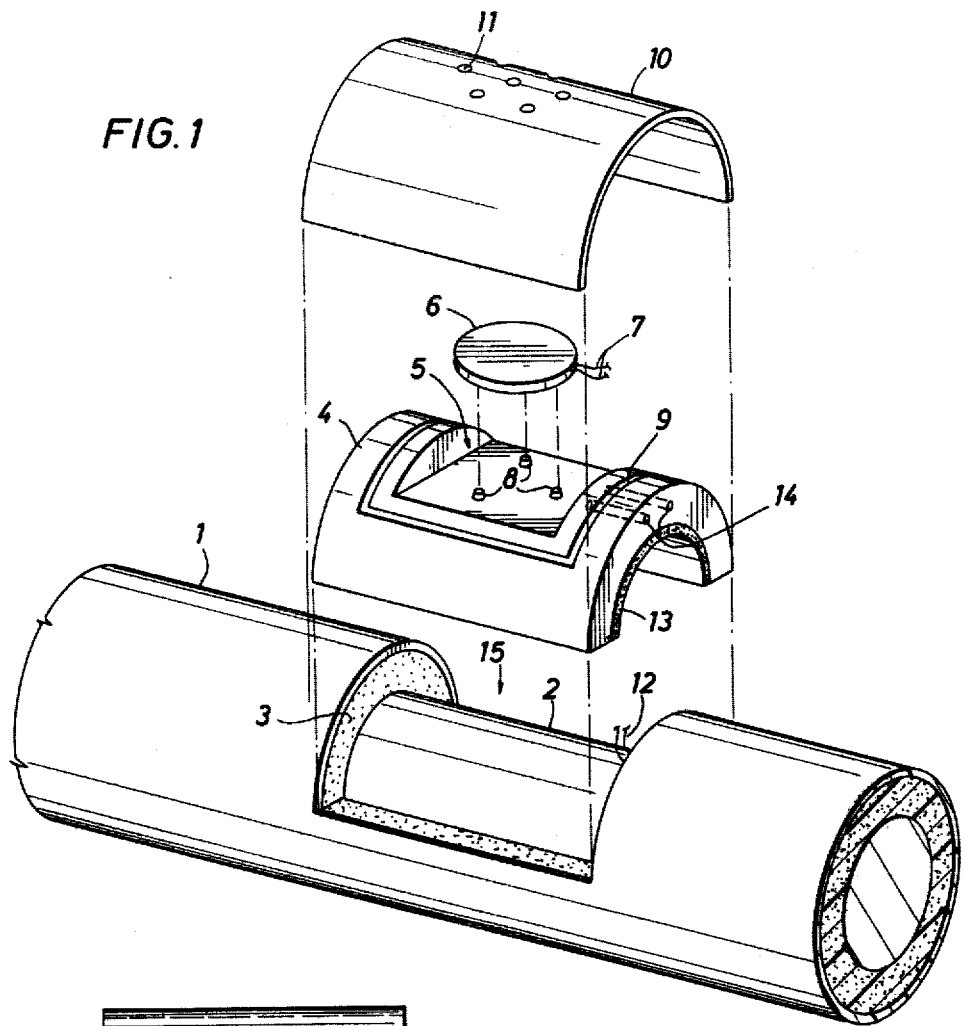
FIG.1
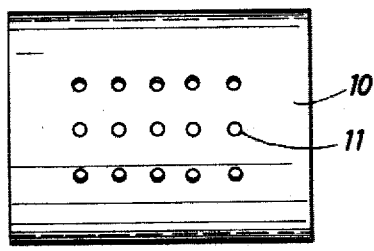
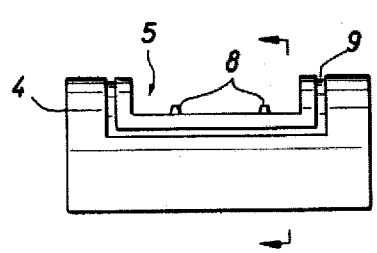
FIG.2
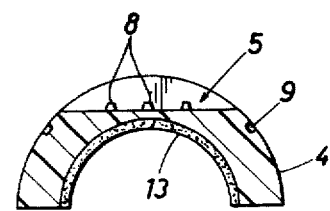

FREE FLOODING HYDROPHONE MOUNTING

BACKGROUND OF THE INVENTION

This invention relates generally to marine seismic cables and more particularly to a seismic transducer mounting for placing seismic transducers at discrete locations along the seismic cable.

In marine seismic exploration, the seismic cable is towed in a submerged fashion behind a marine vessel, and seismic detectors in the cable receive reflections of acoustic wave energy in order to map the geologic strata beneath the surface of the earth. The acoustic wave energy is produced by devices well known to those skilled in the art and produces the reflections received at the transducer locations. Transducers are electrically connected to various recording apparatus onboard the marine vessel, wherein recording and/or processing of the collected seismic data may take place.

In the past, a number of seismic cables have been available for use in this type of seismic exploration. For instance, one streamer cable comprises a longitudinal tubular member which contains a plurality of hydrophone transducers spaced therealong, with a number of wires interconnecting these hydrophones disposed within the tubular member. The tubular member may be filled with a liquid, such as oil or kerosene, to provide proper flotation.

However, one drawback with the use of such liquid-filled cables has been their susceptibility to damage. This occurs because the tubular member must necessarily have thin walls to allow for the transmission of acoustic wave energy. If this thin wall should rupture, the hydrophones contained within the tubular member may be damaged or destroyed. In addition to this disadvantage, the transducers mounted within the hollow tubular member must be insulated from the effects of the oil or kerosene filling the cable and of course from any water which may find its way into the cable due to leakage. The hydrophones are easily susceptible to damage or breakage during deployment or handling of the streamer cable.

Another cable which has solved some of the above problems has been a seismic cable of solid construction which utilizes a solid to provide buoyancy as opposed to a liquid. Typically, a stress member is provided to allow towing of the solid seismic streamer cable. This stress member may be a single steel cable, or may be a synthetic with sufficient tensile strength to support the seismic cable. The electrical conductors needed to interconnect the hydrophones or transducers with each other and with the shipboard electronics may be located within the stress member or may surround the stress member in some fashion. Various types of hydrophones have been utilized with the solid cable construction, two of which will now be described.

One type of hydrophone which has been used with the solid cable construction is a piezoelectric crystal of cylindrical construction which is mounted concentrically around the central core of the streamer cable, such as that described in U.S. Pat. No. 3,739,326, issued to Kerr et al. An air gap is provided beneath the cylinder to allow the piezoelectric crystal to respond to impinging seismic energy. This type of hydrophone suffers loss of sensitivity when water leaks into the air gap, which may occur when the cable is submerged and subsequently damaged. Another type of hydrophone for use in a cable of solid construction is described in U.S. Pat. No. 3,781,778 issued to Sawin et al. A disc-type hydrophone is mounted within a rigid case, which case is mounted on an eccentrically placed cable core of the seismic streamer cable. A gel is used to couple an outer covering of the case to the hydrophone so that acoustic wave energy is received by the hydrophone and transmitted to the shipboard electronics. The case construction is such that the entire structure conforms to the profile of the seismic cable. A urethane jacket is extruded over the case after it has been placed in a cavity of the hydrophone cable to provide a relatively smooth outer surface. However, this type of hydrophone mounting has been found susceptible to loss of response from puncture of the cable adjacent the rigid mountings and the resultant entry of sea water, or, more frequently, creation of vapor pockets in the cavity due to diffusion. In addition, hydrophone repair is made difficult because of the jacket which has been extruded over the hydrophones.

Both of the above hydrophone mounts are fairly sensitive to cable borne noise. Cable stress member perturbations such as longitudinal, lateral, or torsional waves which are picked up by hydrophones are referred to as cable borne noise. For instance, sealed cavities are very sensitive to mount deformations induced by stress member perturbations.

Another type of transducer mount is described in U.S. Pat. No. 3,281,769 issued to Hueter wherein a sound source transducer is described. The sound source is free flooding and is activated by an applied potential. The device is tuned to very specific frequencies (quarter wavelength of the sound wave tube). Since seismic data reception requires a flat frequency response in the seismic band of approximately 5 Hz to 150 Hz, the invention described could not function effectively as a sound sensor. Each Hueter device would only function for a specific frequency, and exceedingly long sound tubes would be necessary (8 to 242.5 feet) to cover the seismic band wavelengths.

SUMMARY OF THE INVENTION

In accordance with the invention, a hydrophone mounting is provided which allows flooding within the hydrophone mounting to take place when the seismic cable containing one or more hydrophones is submerged. The hydrophone and associated leads are electrically insulated to avoid shorting by the surrounding water. The hydrophone mounting forms a cavity which is covered by rigid or elastic skin, which skin contains orifices. The cavity is therefore in direct communication with the outside environment and is directly exposed to sound waves in that environment. The orifices do create additional flow noise. However, it has been found that the frequency of the noise is a function of orifice size and thus can be controlled and forced to be outside the seismic band. The free flooding cavities allow greater protection of the individual hydrophones, due to the relatively rigid cover. Since the cover allows free flooding of the cavity containing the hydrophone and the hydrophone and electrical leads are insulated, there is no need for concern because of leaks due to punctures or tears. Since the cavity is open, mount distortions due to stress member perturbations cannot build up pressure within the cavity and the mount is less sensitive to cable borne noise. Ease of repair is enhanced by accessibility to the hydrophones. In addition to these advantages, the manufacturing process for a seismic cable utilizing the hydrophone mountings of the present invention is less costly. Since the freely flooded mounts are open to the sound carrying water in which they are immersed, these mounts do not lose any sensitivity as compared to sealed mounts which have an intervening jacket.

BRIEF DESCRIPTION OF THE DRAWING

The present invention will be more easily understood by the following detailed description when taken in conjunction with the attached drawings, in which:

FIG. 1 is a representation of a section of seismic cable and the location of a transducer mounting therein.

FIG. 2 is a representation showing different views of the seismic transducer mounting of the invention and its cover.

DETAILED DESCRIPTION OF THE INVENTION

Figure 3:
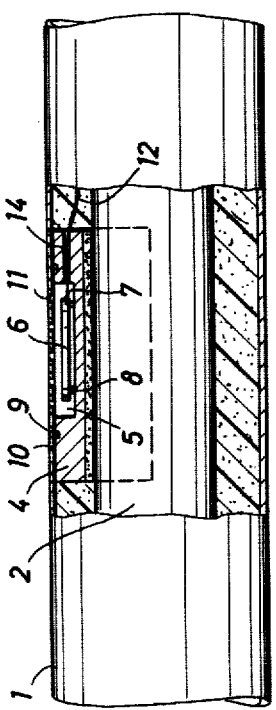
FIG. 3 is a cross-section of a portion of the seismic cable showing the relationship of the transducer mounting in place.

Referring now to FIG. 1, there is shown a seismic cable of solid construction with solid core 2. Flotation material such as a buoyant foam 3 may be provided to furnish the proper buoyancy and towing characteristics. According to the invention, a rigid structure 4 of curved shape is provided with cavity 5 for mounting disc-type hydrophone 6 therein. Electrical conductors 7 are utilized to connect the hydrophone to the proper conductors 12 which are situated in cable 1. To permit free flooding of cavity 5 and exposure of both sides of the hydrophone 6 to the sea water, raised portions 8 are provided for supporting hydrophones 6. The raised portions are preferably studs made of a resillient material such as rubber; an optimal number has been found to be 3. The studs may be either cast into place or glued into place by an adhesive. The hydrophone, consisting of a solid support on which piezoelectric crystals are mounted, is attached onto the studs at the solid support, leaving the piezoelectric crystals free. Groove 9, which may be machined or molded in hydrophone mounting 4, acts as a sealing groove and may be filled with an adhesive before placing cover 10 over the mounting. Mounting 4 and cover 10 may be constructed from any materials which will retain a relatively rigid shape, such as moldable plastics, or non-corroding metals such as stainless steel. Mounting 4 is preferably molded or machined to a shape whose outer radius of curvature is substantially the same as the outer radius of the seismic cable after cover 10 is placed upon it, and whose inner radius of curvature is somewhat larger than the outer radius of the cable core. The gap between the core and mounting 4 is filled with a soft, elastic material 13 such as a syntactic foam. This material serves to bond the mounting to the core and, being soft, isolate the mounting from motions and perturbations within the core. Cover 10 is constructed so as to conform to mounting 4.

In the design of cover 10, the following considerations must be observed. The flooded hydrophone cavities must have an acceptable frequency response, must be relatively free flooding, and must have acceptable flow noise characteristics. It has been discovered that the size of the required pressure ports or openings 11 for maintaining a flat frequency response in the seismic band is inversely proportional to the number of such ports. In other words, multiple small ports require a smaller total sensing area than a single large port.

Based on these considerations, it is possible to design free flooding cavities which can be flooded with at least 90% efficiency. For instance, if the total fluid volume of the hydrophone mounts is 3.68 cm$^3$ the atmospheric air volume is 0.368 cm$^3$. As the cable enters the sea, increased pressure due to increasing depth will compress the air volume to an even smaller percentage of the total fluid volume.

It may be easily shown, by resort to mathematical methods well known in the art, that the hydrophone frequency responses in flooded cavities may be modeled by an electrical analog. The applicable relation for providing the electrical analog are given in *Theoretical Acoustics*, P. M. Morse and K. U. Ingard, McGraw-Hill, New York, 1968.

Using the electrical analog, it may be shown that $$\frac{e_o}{e_i} = \frac{-X_c}{[R^2 + (X_L + X_C)^2]^{\frac{1}{2}}} \quad (1)$$

$$-\theta = \tan^{-1}\left(\frac{X_L + X_C}{R}\right) + 90° \quad (2)$$

$$f_r = \frac{1}{2\pi (LC)^{\frac{1}{2}}} \quad (3)$$

where $e_o/e_i$ is the hydrophone gain, $\theta$ the phase shift, $f_r$ the resonance frequency, $X_C(-\frac{1}{2}\pi fC)$ and $X_L(2\pi fL)$ capacitive and inductive reactance, R resistance, C capacitance, and L inductance. The resistance, capacitance, and inductance for hydrophone cavities with open ports to the sea or atmosphere are given by $$R = \frac{2\rho \, [\nu f/\pi]^{\frac{1}{2}}}{d^2} \ln\left(\frac{d}{h}\right) \quad (4)$$

$$C = KV \quad (5)$$

$$L = \frac{\rho}{d} \quad (6)$$

where $\rho$ and $\nu$ are the density and kinematic viscosity of the medium passing through the port, d and h the port diameter and wall thickness, respectively, f frequency, K and V the compressibility and volume of the cavity contents. Liquid and gas compressibilities are modeled by $$K_{liquid} = 1/\rho c^2 \quad (7)$$

$$K_{gas} = 1/P \quad (8)$$

where c is the speed of sound and P the absolute pressure. For multiple components within the cavity capacitances add in parallel while for multiple ports resistances and inductances add in parallel.

As can be seen, the desired response can be obtained by a variety of port sizes if the number of ports is allowed to vary. Since it has been discovered that large ports lead to higher flow noises, it becomes desirable to choose a number and size of ports which minimizes the flow noise. It has been found advantageous to construct the hydrophone mounting covers that have a number of openings approximately less than 1/16-inch, or 0.16 cm.

However, since flooding of the hydrophone cavities becomes more difficult with decreased hole or port size, it may be useful to apply surface active agents to the mounting and cover to enhance their flooding characteristics. Based on all considerations, it has been found most useful to provide hydrophone mountings with covers having 10 to 50 ports, with port diameters of 0.05 to 0.25 cm. The optimal size for cover 10 under these conditions has been found to range from 1 to 20 square inches.

If the following sea water properties, and hydrophone and mount properties are utilized, $\rho_{water}$: 1.027 gm/cm$^3$
$c_{water}$: 149,350 cm/sec
$\nu_{water}$: 0.014 cm$^2$/sec
P: $1.63 \times 10^6$ dynes/cm$^2$
Total Cavity Fluid Volume: 3.680 cm$^3$
Hydrophone Volume: 0.469 cm$^3$
Hydrophone Compressibility: $2.145 \times 10^{-7}$ cm$^2$/dynes equations 1 and 2 may be applied to find the port diameter for any desired number of ports. Representative port sizes for selected numbers of ports and port thicknesses are tabulated below:

TABLE I

| Number Ports | Port Thickness (cm) | Port Diameter (cm) | Total Port Area (cm$^2$) | Gain at 150 Hz (db) | Phase Shift at 150 Hz (deg) |
|---|---|---|---|---|---|
| 1 | 0.0762 | 2.0260 | 3.2238 | 1.0 | −0.02 |
| 6 | 0.0762 | 0.3377 | 0.5373 | 1.0 | −0.05 |
| 12 | 0.0762 | 0.1688 | 0.2687 | 1.0 | −0.06 |
| 24 | 0.0254 | 0.0844 | 0.1343 | 1.0 | −0.17 |
| 24 | 0.0762 | 0.0844 | 0.1343 | 1.0 | −0.01 |
| 24 | 0.1524 | 0.0844 | 0.1343 | 1.0 | −179.92 |

As can be seen, the amplitude response at 150 Hz is not significantly affected by the port wall thickness. However, the phase shifts by 180° for wall thicknesses greater than the port diameter.

Locations of ports 11 on cover 10 of FIG. 1 are not important as far as pressure response is concerned, as long as they are located above cavity 5. Of course, their size and thicknesses should conform to the data set forth above.

The port location, however, is important for free-flooding. The ports should be distributed such that water can enter and force air out no matter what the mount orientation is. The best way to achieve this result is to distribute the ports 11 uniformly over cavity 5 with some ports immediately adjacent the cavity boundaries along all sides of the cavity.

Port location is also influenced by normal boundary layer noise considerations. Boundary layer noise is always present, regardless of presence of ports, whenever a solid surface moves through a fluid. This noise is highly localized and random. Due to the localized and random nature of this noise, hydrophone response to it can be significantly reduced by increasing the area over which the hydrophone senses the noise. A large area averages this boundary layer noise and thus effectively reduces the sensed noise. Thus, the ports are preferably spread over a large area.

The surfactant which may be utilized to facilitate flooding of the cavity is a 3% by weight sodium meta silicate water solution in which the stainless steel cover is dipped. The plastic hydrophone mounting 4 and hydrophone 6 may be dipped in a 1.2% by weight DuPont Zonyl FSB (a trademark of E. I. DuPont de Nemours, Inc.) solution. These surfactants may be reapplied at later times by passing the cable through a container of these solutions.

To place the hydrophone mountings in cable 1 and prepare the seismic cable for field use, the following procedure has been used with success. Referring to FIGS. 1, 2 and 3, the following procedure has been used with success. Mount 4 is cast from 40% fiberglas-filled polyurethane. Three 1/32-inch O.D., ⅛-inch long studs are glued into place. Houston Products & Services Inc. Sh-018 hydrophone 6, electrically insulated by Micro Measurements, Inc. M-Coat D, is glued onto studs 8. Hydrophone leads 7 are passed out of the cavity through apertures 14. All internal cavity surfaces are coated with DuPont Zonyl FSB. 0.05-inch thick stainless steel plate 10, bent to the outer radius of the mount 4 has fifteen 1/16-inch ports 11 uniformly distributed over cavity surface 5 with a surface area of 1.35 square inches. The cover plate is coated with sodium meta silicate, dried, and then glued onto the mount 4. Hydrophone leads 7 are connected to cable leads 12 and coated with M-Coat D. An uncured, soft, syntactic polyurethane foam is poured onto the cable core 2 and the mount 4 is properly positioned with respect to the cable core. The foam is allowed to cure fixing the mount 4 onto the core 2. Ports 11 are temporarily plugged and buoyancy foam 3 is extruded over the cable core 2 filling out the cable to an approximately uniform, round shape with a radius of approximately that of the mounts 4. After curing of the buoyancy foam, an external jacket is extruded over the entire cable by methods well known in the art and the plugs are removed from the ports 11.

Figure 4:
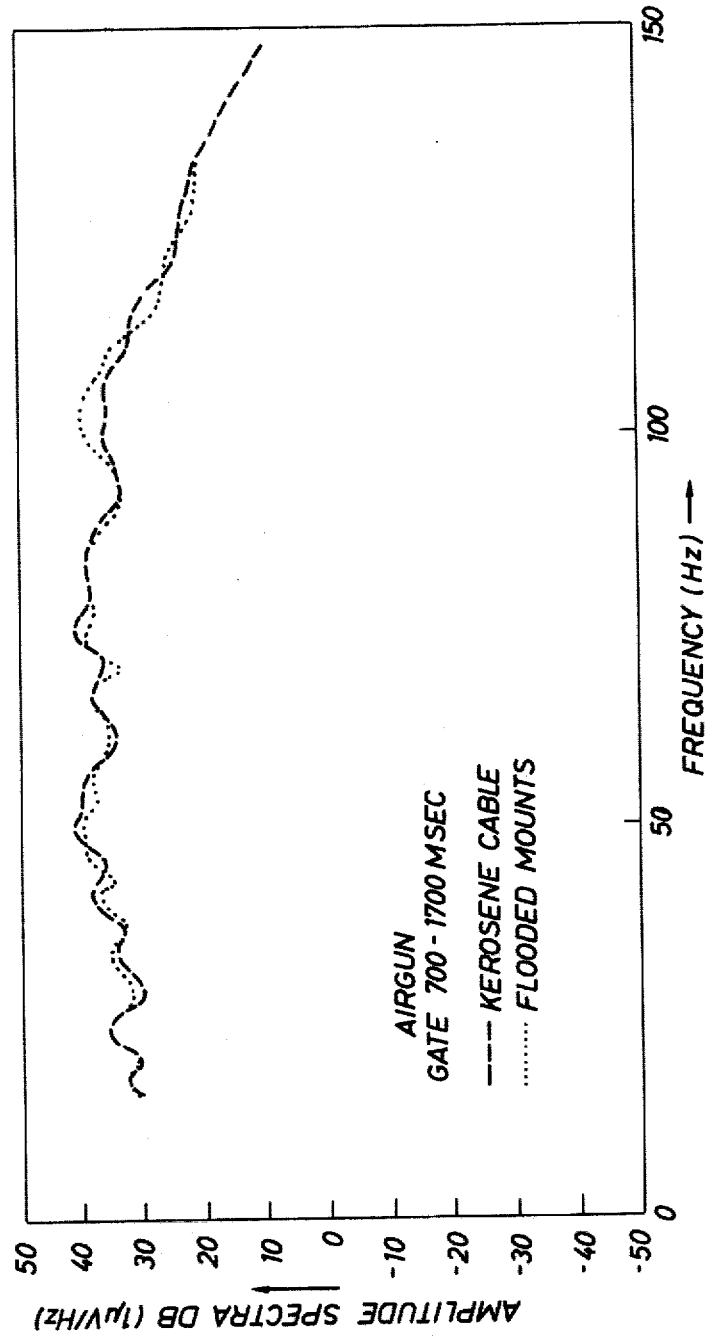
FIG. 4 is a comparison of the response of a kerosene-filled cable and the free-flooding mounts of the invention.

Hydrophones constructed as above were tested in sea trials and compared to the conventional kerosene-filled cable employed by the industry. The pressure sensitivity was comparable as shown in FIG. 4, while response to cable borne noise was reduced. The amount of reduction in cable noise was variable with location in the cable, type of perturbation, and quality of mounting, but on the average a reduction of 5 db was achieved.

We claim:

1. Apparatus for mounting a seismic transducer for use in a seismic streamer cable which is comprised of flotation material and a cable core having a longitudinal axis, said core including a stress member, said cable having electrical conductors disposed therein and a plurality of seismic transducers connected to said electrical conductors, said transducer mounting comprising:
   a rigid structure having a cavity therein opening to the exterior thereof for containing said seismic transducer, said rigid structure located within said seismic cable adjacent said cable core;
   means located within said cavity for supporting said seismic transducer and allowing substantially free circulation for fluids external the streamer cable therebelow; and,
   a cover for said rigid structure having one or more openings therein for permitting entry of external fluids into said cavity and exit therefrom, said cover conforming to the exterior profile of said rigid structure.

2. Apparatus according to claim 1, including means for sealing said cover to said rigid structure.

3. Apparatus according to claim 1, including means for bringing said seismic transducer electrical leads out of said mounting.

4. Apparatus according to claim 1, including means for electrically insulating said transducer and said transducer electrical leads.

5. Apparatus according to claim 1, wherein said means for supporting said seismic transducer comprises raised portions arranged in a trihedral pattern.

6. Apparatus according to claim 5, wherein said raised portions are three in number and comprised of a resilient material.

7. Apparatus according to claim 1, including means arranged to allow electrical connection between said electrical conductors of said seismic cable and said seismic transducers.

8. Apparatus according to claim 1, wherein said rigid structure has a curved shape conforming generally to the shape of said seismic cable on its exterior side and conforming to the shape of said cable core on its interior side.

9. Apparatus according to claim 8, wherein said rigid structure is curved radially such that its inner diameter conforms to the outer diameter of said cable core, and its outer diameter conforms substantially to the outer diameter of said seismic cable.

10. Apparatus according to claim 9, wherein said cover is curved radially to conform substantially to the outer diameter of said seismic cable.

11. Apparatus according to claim 1, wherein either of said rigid structure or said cover or both are comprised of plastic.

12. Apparatus according to claim 1, wherein either of said rigid structure or said cover or both are comprised of stainless steel.

13. Apparatus according to claim 1, wherein a soft, compliant substance is introduced between said mounting and said cable core.

14. Apparatus according to claim 13, wherein said substance adheres to said mounting and said cable core.

15. Apparatus according to claim 1, wherein said openings have cross sectional areas having average diameters of 0.05 to 0.25 centimeters.

16. Apparatus according to claim 1, wherein said cover has 10 to 50 openings.

17. Apparatus according to claim 1, wherein said openings are distributed uniformly over an area ranging from 1 to 20 square inches.

18. Apparatus according to claim 1, wherein at least some of said openings are adjacent said cavity boundary.

19. Apparatus according to claim 1, wherein said rigid structure, said seismic transducer, and said cover are coated with a surfactant to facilitate flooding of said cavity.

* * * * *